(12) United States Patent
Chaki

(10) Patent No.: US 12,487,847 B2
(45) Date of Patent: Dec. 2, 2025

(54) VIRTUAL FIREWALL FOR USE IN A PRIVATE MOBILE CORE

(71) Applicant: AT&T Intellectual Property I, L.P., Atlanta, GA (US)

(72) Inventor: Tarun Chaki, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 313 days.

(21) Appl. No.: 18/300,641

(22) Filed: Apr. 14, 2023

(65) Prior Publication Data

US 2024/0345861 A1    Oct. 17, 2024

(51) Int. Cl.
| | |
|---|---|
| G06F 9/455 | (2018.01) |
| G06F 15/16 | (2006.01) |
| H04L 15/16 | (2006.01) |
| H04L 43/10 | (2022.01) |
| H04W 8/18 | (2009.01) |
| H04W 8/26 | (2009.01) |
| H04W 12/088 | (2021.01) |
| H04W 76/15 | (2018.01) |

(52) U.S. Cl.
CPC ...... *G06F 9/45558* (2013.01); *H04W 12/088* (2021.01); *G06F 2009/45587* (2013.01)

(58) Field of Classification Search
CPC ....... G06F 9/45558; G06F 2009/45587; G06F 2009/45595; H04W 12/088
USPC .......................................................... 726/11
See application file for complete search history.

(56) References Cited

U.S. PATENT DOCUMENTS

| | | | | |
|---|---|---|---|---|
| 9,569,233 | B2 * | 2/2017 | Masters | G06F 9/4862 |
| 12,267,212 | B2 * | 4/2025 | Zhou | H04L 41/0895 |
| 2016/0381662 | A1 * | 12/2016 | Wang | H04W 12/00 370/329 |
| 2017/0111274 | A1 * | 4/2017 | Bays | H04L 49/70 |
| 2017/0168864 | A1 * | 6/2017 | Ross | H04L 45/021 |
| 2021/0345108 | A1 * | 11/2021 | Li | H04W 72/53 |
| 2022/0200801 | A1 * | 6/2022 | Potlapally | H04L 63/0428 |
| 2023/0336411 | A1 * | 10/2023 | Metkar | H04L 67/10 |
| 2024/0056803 | A1 * | 2/2024 | Huang | H04W 24/08 |
| 2024/0111603 | A1 * | 4/2024 | Krasilnikov | G06F 9/45558 |

FOREIGN PATENT DOCUMENTS

| | | | | | |
|---|---|---|---|---|---|
| CN | 103870749 | A | * | 6/2014 | G06F 21/53 |
| CN | 107544835 | A | * | 1/2018 | H04L 1/00 |
| CN | 113543152 | A | * | 10/2021 | G06F 9/45558 |
| WO | WO-2016177207 | A1 | * | 11/2016 | H04L 12/46 |
| WO | WO-2024057063 | A1 | * | 3/2024 | H04L 41/0604 |

* cited by examiner

*Primary Examiner* — Emmanuel L Moise
*Assistant Examiner* — Berhanu Shitayewoldetadik
(74) *Attorney, Agent, or Firm* — Guntin & Gust, PLC; John G. Rauch

(57) ABSTRACT

Aspects of the subject disclosure may include, for example, a method that includes deploying a first virtual machine configured to implement a plurality of control plane network functions in a wireless network, deploying a second virtual machine configured to implement a user plane function in the wireless network, deploying a third virtual machine configured to implement firewall functions, and deploying the first virtual machine, the second virtual machine and the third virtual machine on an on-premises host server. Other embodiments are disclosed.

20 Claims, 10 Drawing Sheets

- Static Route 1: N2 traffic – Base Station → Virtual Firewall → AMF — 232
- Static Route 2: N3 traffic – Base Station → Virtual Firewall → UPF — 234
- Static Route 3: N4 traffic - SMF → Virtual Firewall → UPF — 236
- Static Route 4: N2 traffic - AMF → Virtual Firewall → Base Station — 238
- Static Route 5: N4 traffic- UPF → Virtual Firewall → SMF — 240
- Static Route 6: N3 traffic - UPF → Virtual Firewall → Base Station — 242

FIG. 2D

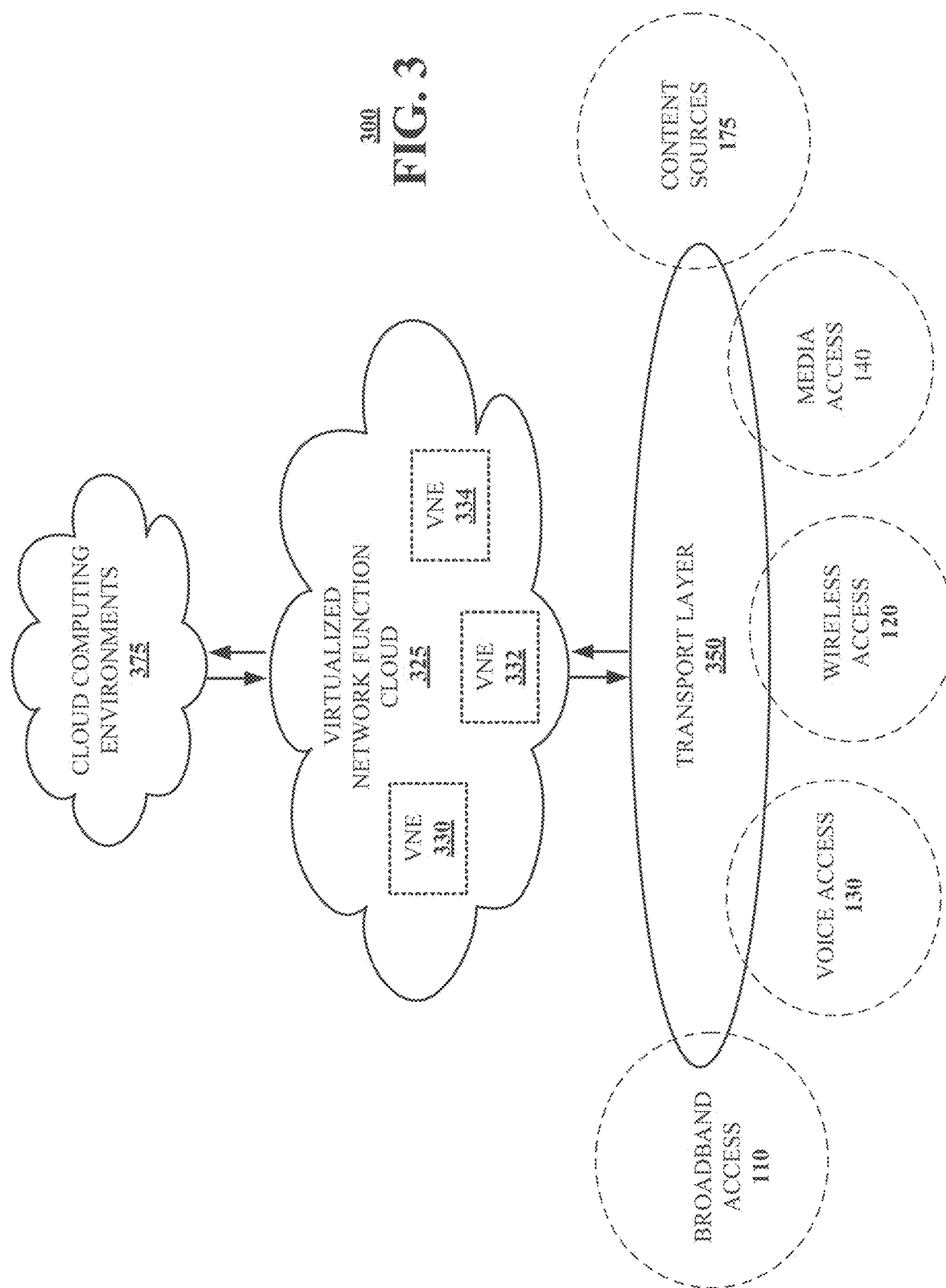

VIRTUAL FIREWALL FOR USE IN A PRIVATE MOBILE CORE

FIELD OF THE DISCLOSURE

The subject disclosure relates to network based systems and methods for deploying a virtual firewall in a private mobile core in wireless communication networks.

BACKGROUND

Wireless communication networks, in particular, cellular networks have undergone significant change. The Third Generation (3G) cellular communication standards have changed to the Fourth Generation (4G) cellular standards which have started the transition to the Fifth Generation (5G) cellular standards.

The 5G cellular network provides additional degree of freedom in how the radio spectrum is used and adapted to allocate radio resources to support different applications and users. Businesses and individuals desire to establish private wireless communication networks that can provide internet access at their premises in order to meet business needs and have more flexible and customized options.

BRIEF DESCRIPTION OF THE DRAWINGS

Reference will now be made to the accompanying drawings, which are not necessarily drawn to scale, and wherein:

FIG. 2D depicts an illustrative embodiment of service-chaining of network functions to virtual firewall functions in accordance with various aspects described herein.

FIG. 3 is a block diagram illustrating an example, non-limiting embodiment of a virtualized communication network in accordance with various aspects described herein.

DETAILED DESCRIPTION

Figure 1:
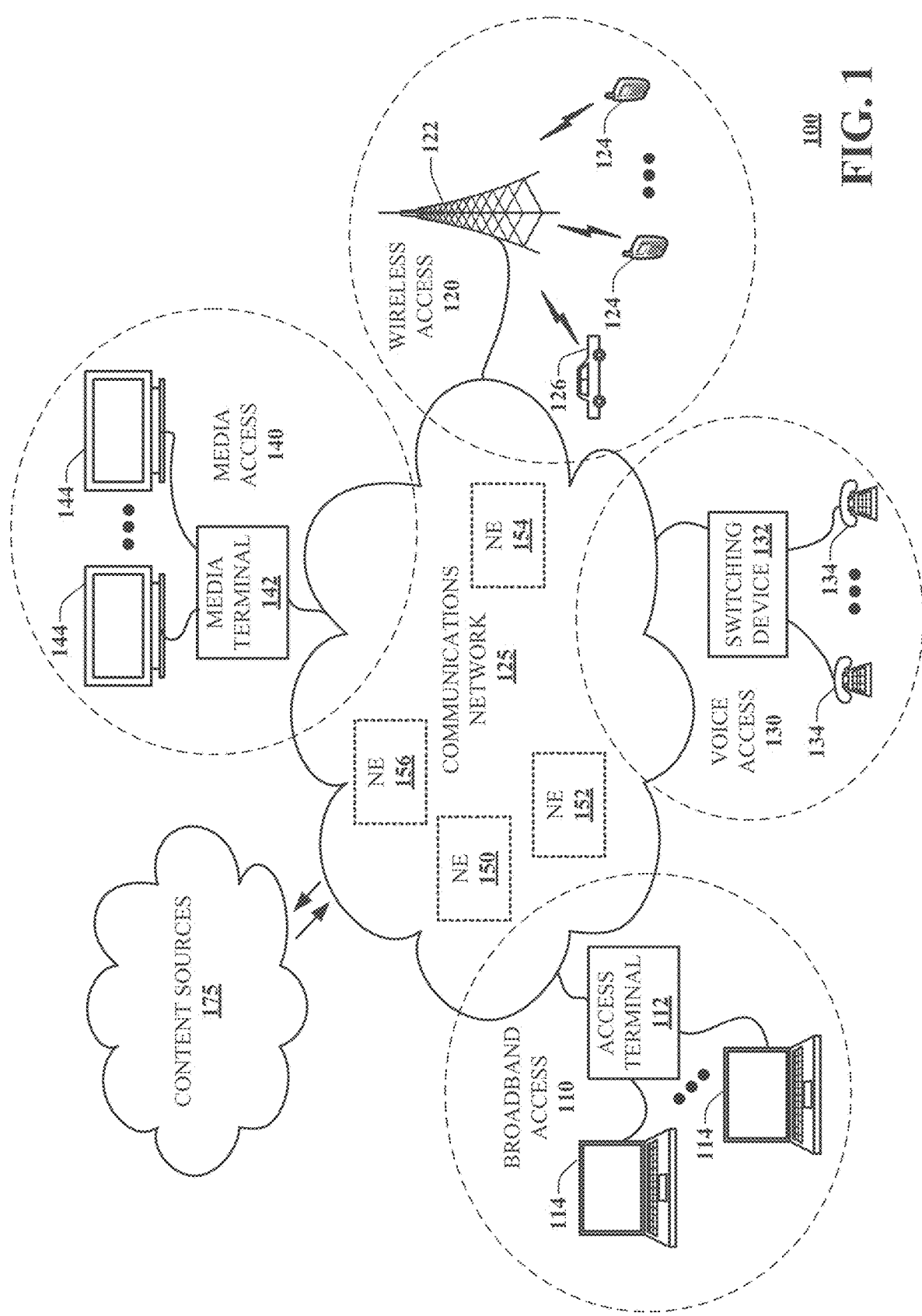
FIG. 1 is a block diagram illustrating an exemplary, non-limiting embodiment of a communications network in accordance with various aspects described herein.

The subject disclosure describes, among other things, illustrative embodiments for deploying a virtual machine implementing firewall functions in a private mobile core of a cellular communication network. The private mobile core operates on a host server arranged at a user premises and provides internet connection to a user. The virtual machine implementing the firewall functions can be deployed simultaneously or sequentially by service-chaining network functions to the firewall functions. The service-chaining may be performed by establishing one or more static routes of network traffics at a plurality of network interfaces between a base station and the network functions of the private mobile core. Other embodiments are described in the subject disclosure.

One or more aspects of the subject disclosure include a device including a processing system including a processor, and a memory that stores executable instructions that, when executed by the processing system, facilitate performance of operations. The operations further include deploying a first virtual machine configured to implement a plurality of control plane network functions, deploying a second virtual machine configured to implement a user plane function, and deploying a third virtual machine configured to implement firewall functions in a wireless communication network. The first virtual machine, the second virtual machine and the third virtual machine are deployed on an on-premises host server.

The third virtual machine is deployed by service-chaining the plurality of control plane network functions and the user plane function via the third virtual machine. The third virtual machine is deployed to be in-line with the base station and virtualized network functions such that one or more static routes are established to direct network traffic to flow through the third virtual machine.

One or more aspects of the subject disclosure include a non-transitory machine-readable medium, including executable instructions that, when executed by a processing system including a processor, facilitate performance of operations. The operations include deploying a first virtual machine configured to contain a plurality of control plane network functions, deploying a second virtual machine configured to contain a user plane function, deploying a third virtual machine configured to contain firewall functions in a wireless communication network, and deploying the first virtual machine, the second virtual machine and the third virtual machine on an on-premises host server.

One or more aspects of the subject disclosure include a method. The method includes deploying, by a processing system including a processor, a private mobile core on a host server located at a premises of a user. The deploying includes deploying a first virtual machine configured to implement a plurality of control plane network functions, and deploying a second virtual machine configured to implement a user plane function. The method further includes deploying, by the processing system, a third virtual machine configured to implement firewall functions on the host server and setting, by the processing system, one or more static routes of network traffic to pass through the third virtual machine.

The setting the one or more static routes further includes directing, by the processing system, a first network traffic between a base station and the first virtual machine, a second network traffic between the first virtual machine and the second virtual machine, a third network traffic between the base station and the second virtual machine, or a combination therefor, to pass through the third virtual machine.

The method further includes analyzing, by the processing system, threats posed by the first network traffic, the second network traffic, the third network traffic, or a combination thereof, by performing a correlation among the first network traffic, the second network traffic and the third network traffic. The performing the correlation further comprises matching, by the processing system, information from the second network traffic against information from the third network traffic. The method further includes, based on the correlation, determining an anomaly in usage of network resources and blocking a network traffic determined to be relevant to the anomaly among the first network traffic, the second network traffic, the third network traffic, or a combination thereof. Additionally, or alternatively, the method includes, based on the correlation, determining a malicious traffic, and blocking a network traffic determined to be relevant to the malicious traffic among the first network traffic, the second network traffic, the third network traffic, or a combination thereof.

Referring now to FIG. 1, a block diagram is shown illustrating an example, non-limiting embodiment of a system 100 in accordance with various aspects described herein. For example, the system 100 can facilitate in whole or in part deploying a private mobile core and a virtual firewall on a host server in a wireless network system. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
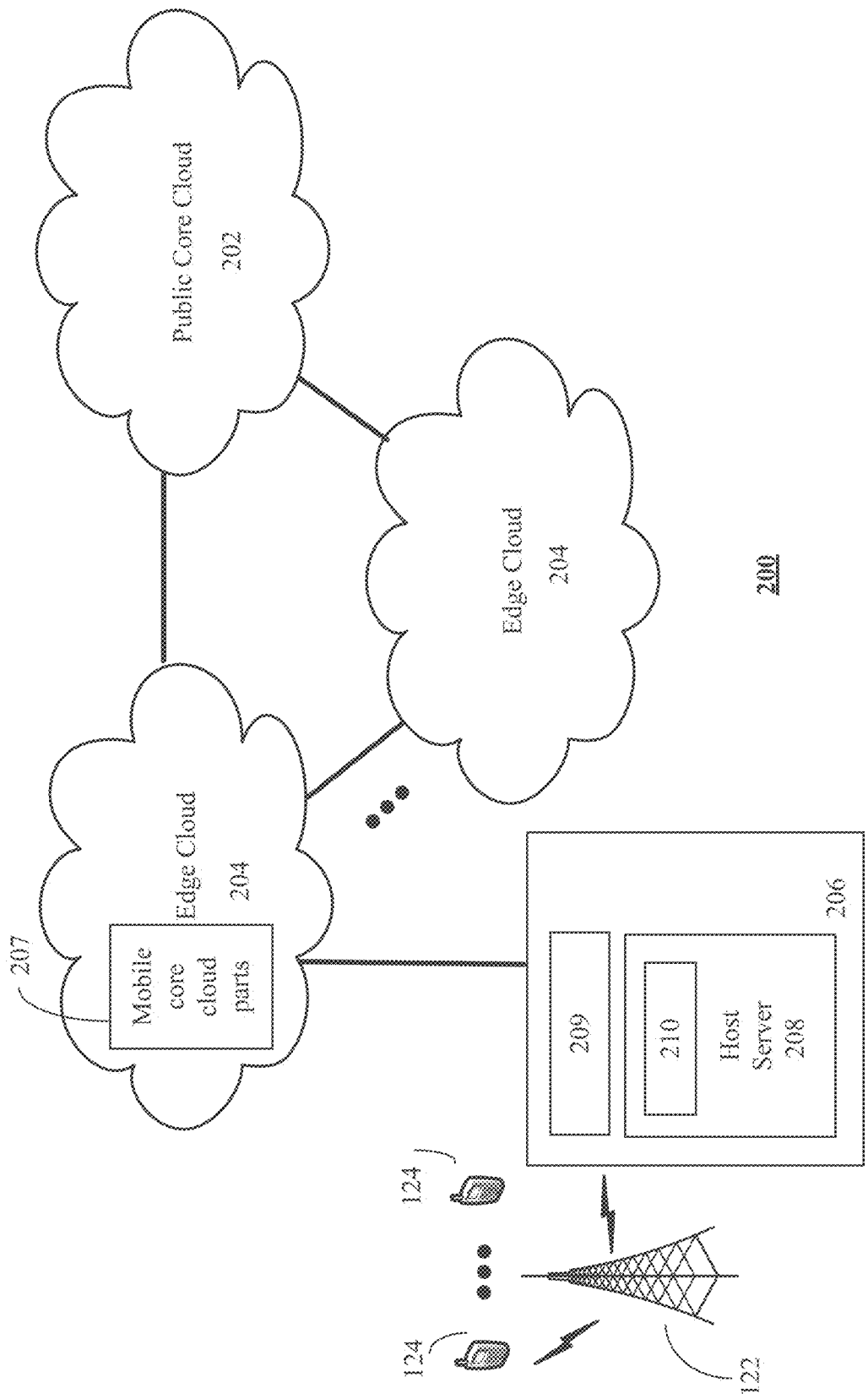
FIG. 2A is a block diagram illustrating an example, non-limiting embodiment of a private wireless network functioning within the communication network of FIG. 1 in accordance with various aspects described herein.

FIG. 2A is a block diagram illustrating an example, non-limiting embodiment of a private wireless network 200 functioning within the communication network of FIG. 1 in accordance with various aspects described herein. In one or more embodiments, the private wireless network 200 operates as the 5G cellular network or next generation cellular networks. In the 5G cellular network, business customers, e.g., small businesses, desire to set up their own private mobile cores that facilitate provision of internet connections. In one or more embodiments, a private mobile core may be installed on a single server, such as a one rack unit, in a customer premises. As depicted in FIG. 2A, a host server 208 is arranged in a customer premises 206 and the private mobile core 210 may be installed or deployed on the host server 208. The host server 208 is communicatively connected to the base station or access point 122. In various embodiments, the customer premises 206 includes radio circuitries 209 that transmit or receive radio signals based on a network demand, business needs such as a number of users, various other parameters, etc.

In one or more embodiments, the host server 208 is a general purpose hardware and the private mobile core 210 implements virtualized network functions running on the host server 208. The private mobile core 210 is configured as a virtual mobile core operating on the host server 208. The private mobile core 210 implements a bundle of network functionality which provides internet connectivity for both data and voice services and ensures that the internet connectivity meets the quality of service (QoS) requirements. The virtualized network functionality of the private mobile core 210 is divided into a control plane and a user plane. Control plane network functions include establishing connectivity with user equipment (UE) and forwarding signaling traffic to and from user equipment (UE) which enables user equipment (UE) authentication, registration, and mobility tracking. The control plane network functions further include access authorization, location services, IP address allocation and management of each user equipment session, control of Quality of Service (Qos), management of policy rules, management of user identity, etc. The virtualized network functions further include user plane functions that forward traffic between the radio access network (RAN) and the internet. The user plane functions further manage voice traffic and streaming multimedia traffic.

Additionally, or alternatively, business customers or users may desire to deploy their private mobile cores in a public cloud environment. In one or more embodiments, the private mobile core 210 is deployed in a virtual private cloud hosted within a public cloud. In some embodiments, a range of IP addresses is reserved for the private mobile core 210 and not available to other users of the public cloud. By way of example, the host server 208 is in communication with an edge cloud 204 which hosts the virtual private cloud and provides the internet connection services at the customer premises 206, as depicted in FIG. 2A. The edge cloud 204 is communicatively connected with a public core cloud 202. In the public cloud environment, the private mobile core 210 includes the virtualized network functions that are operating on the host server 208 and other functions relevant to the cloud services may be present in a mobile core cloud parts 207 as depicted in FIG. 2A. For instance, cloud service functions such as a service manager, a RAN monitor, a portal, a SIM manager, etc. may be present in the cloud such as in the mobile core cloud parts 207 of the edge cloud 204. The present disclosure is not limited to the configurations illustrated in FIG. 2A and different configurations are available.

Figure 2B:
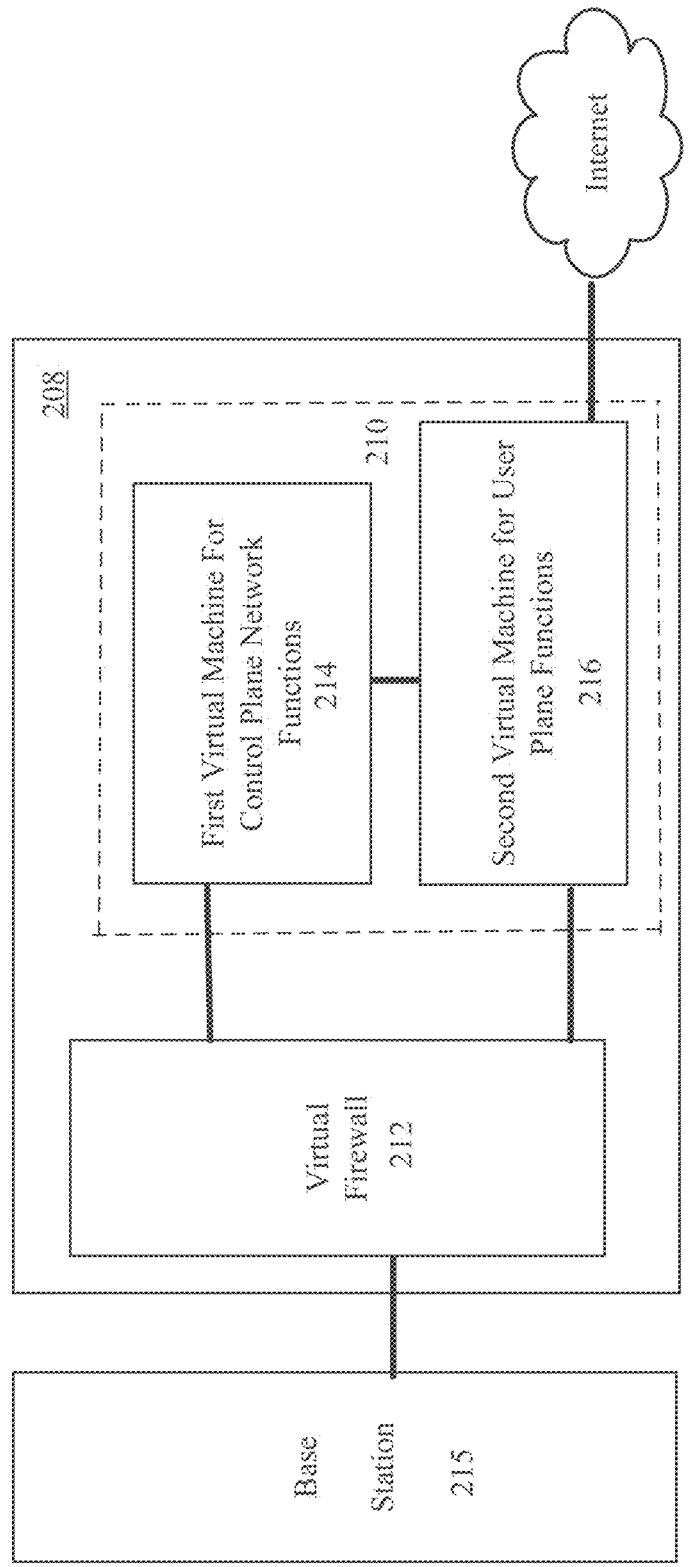
FIG. 2B is a block diagram illustrating an example, non-limiting embodiment of a private mobile core configuration in accordance with various aspects described herein.

FIG. 2B is a block diagram illustrating an example, non-limiting embodiment of a private mobile configuration in accordance with various aspects described herein. In various embodiments, the private mobile core 210 as depicted in FIG. 2B operates as a 5G mobile core and adopts a microservice-like architecture. The private mobile core 210 includes one or more virtual machines that implements a set of virtualized network functions. In some embodiments, the private mobile core 210 includes two virtual machines. As depicted in FIG. 2B, a first virtual machine 214 implements the control plane network functions and a second virtual machine 216 implements the user plane function. The present disclosure is not limited thereto and other modifications and variations are available.

In some embodiments, the private mobile core 210 may encounter external and/or internal malicious traffic. As a security measure, a firewall with threat analytics capabilities may serve as an available tool to provide improved security. As discussed above, network functions of the private mobile core 210 may be implemented with one or more virtual machines. As depicted in FIG. 2B, the control plane network functions can be loaded into a single virtual machine such as the first virtual machine 214. For such a compact design of the private mobile core 210, it may not be feasible to place one or more external firewalls handling all of desired interfaces of network traffic in the wireless communications network such as the 5G cellular network.

As depicted in FIG. 2B, the private mobile core 210 includes a virtual firewall 212 that is communicatively coupled to the first virtual machine 214 and the second virtual machine 216. The virtual firewall 212 is further coupled to the base station 215. In various embodiments, the connections of the virtual firewall 212 depicted in FIG. 2B enable network traffic routes to be established as will be described further in detail below.

Figure 2C:
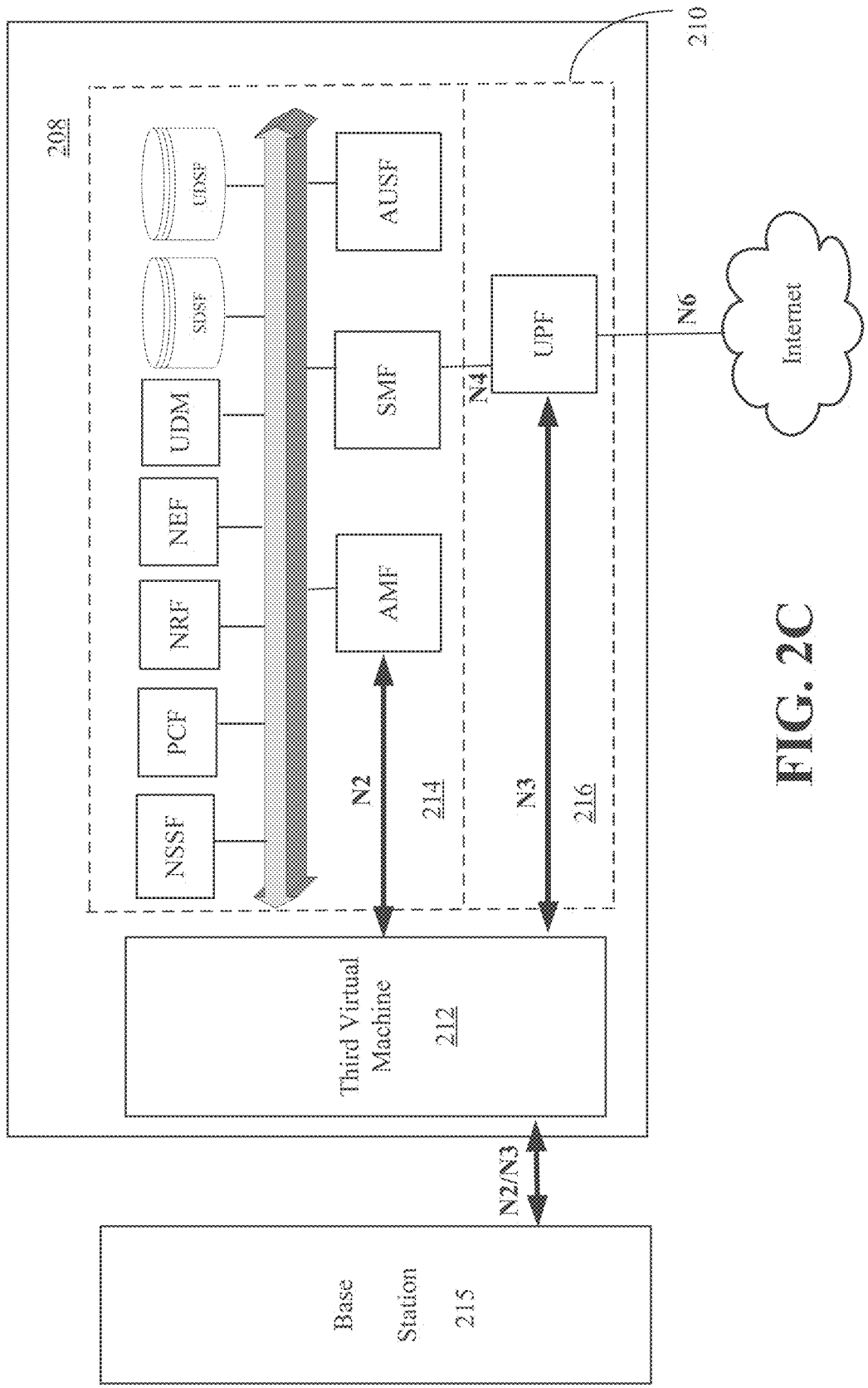
FIG. 2C is a block diagram illustrating an example, non-limiting embodiment of a virtual firewall configuration deployed with a private mobile core in accordance with various aspects described herein.

FIG. 2C depicts a block diagram illustrating an example, non-limiting embodiment of a virtual firewall configuration deployed with a private mobile core in accordance with various aspects described herein. In various embodiments, the first virtual machine 214 and the second virtual machine 216 serve as a private mobile core that provides internet connection to user equipment, mobile devices, IoT devices, etc. In various embodiments, the virtual firewall 210 is implemented as a third virtual machine 212. The first virtual machine 214, the second virtual machine 216 and the third virtual machine 212 reside in the host server 208 located in a premises of a customer. In one or more embodiments, the three virtual machines 214, 216 and 212 are generated by a Kernal-based Virtual Machine (KVM) hypervisor in a Linux server. The KVM hypervisor is a virtualization layer in a kernel-based virtual machine for Linux distribution and allows the Linux kernel to function as a hypervisor. The KVM hypervisor is an open source virtualization architecture. KVM may need a processor with hardware virtualization extensions and provide hardware-assisted virtualization for various guest operating systems including Linux, Windows, MacOS, etc.

In various embodiments, the first virtual machine 214 implements the virtualized network functions. For instance, the first virtual machine 214 may contain the virtualized control plane network functions of 5G standalone architecture. As depicted in FIG. 2C, various virtualized network functions such as NRF, AMF, AUSF, UDM, UDR, SMF, PCF and NSSF are contained in the first virtual machine 214. The second virtual machine 216 contains User Plane Function (UPF). In other embodiments, two or more virtual machines are used and the network functions may be expanded in these virtual machines in a more distributed form. Each network function is described as follows.

AMF (Core Access and Mobility Management Function): AMF manages the mobility of user equipment in a radio access network (RAN) such as mobility management, access authentication and authorization, and location services.

SMF (Session Management Function): SMF manages each UE session, including IP address allocation, control of QoS, etc.

PCF (Policy Control Function): PCF manages the policy rules that other control plane functions enforce.

UDM (Unified Data Management): UDM manages user identity, including the generation of authentication credentials.

AUSF (Authentication Server Function): ASUF is essentially an authentication server.

SDSF (Structured Data Storage Network Function): SDSF manages to store structured data.

UDSF (Unstructured Data Storage Network Function): UDSF manages to store unstructured data.

NEF (Network Exposure Function): NEF manages to select capabilities to third-party services.

NRF (Network Repository Function): NRF manages to discover available services.

NSSF (Network Slicing Selector Function): NSSF manages to select a Network Slice to serve a particular user equipment (UE) and differentiate services to different users.

UPF (User Plane Function): UPF manages to forward traffic between the RAN and the Internet and report traffic usage.

The foregoing network functions are described to the extent that the network functions relate to the deployment and the functions of the virtual firewall, i.e., the third virtual machine 212 and the first and the second virtual machines 214, 216.

In various embodiments, the second virtual machine 216 implements the user plane function (UPF). The second virtual machine 216 carries user data to and from a data network, such as the internet.

In various embodiments, the third virtual machine 212 implements the firewall functions and serves as a virtual firewall. As one example, software for a commercial firewall or an open-source firewall may be installed on the third virtual machine 212. The third virtual machine 212 is capable of detecting and performing threat analytics as will be further described below. Additionally, a policy and a set of rules dictating network traffic flow and a security level may be loaded in the third virtual machine 212.

In various embodiments, the third virtual machine 212 co-resides with the first and the second virtual machines in the host server 208. Alternatively, the first, the second and the third virtual machines 214, 216 and 212 may be hosted in a virtual private cloud within the public cloud using a virtual network (VNET). In light of a compact core running on the host server 208, the third virtual machine 212 may be placed simultaneously at various interfaces of network traffic in the 5G cellular network by service-chaining the virtual firewall functions of the third virtual machine 212 to the private mobile core network functions. Alternatively, the third virtual machine 212 may be placed sequentially at various interfaces of network traffic.

In various embodiments, the service-chaining of the virtual firewall functions to the mobile core network functions are established with respect to several interfaces exposed to external attacks in the 5G standalone core. As depicted in FIG. 2C, N2 Interface is formed between the RAN and the AMF, N3 Interface formed between the RAN and the UPF, N4 Interface formed between the UPF and the SMF, and N6 Interface formed between the UPF and a data network name (DNN). As depicted in FIG. 2C, N2 is an interface between the base station 215 and the AMF in the first virtual machine 214. N3 is an interface between the base station 215 and the UPF in the second virtual machine 216. N4 is an interface between the SMF in the first virtual machine 214 and the UPF in the second virtual machine 216. Although the UPF in the second virtual machine 216 supports N6 Interface, N6 may be protected by one or more external firewalls arranged by a cloud service provider, a cellular network provider, etc. The inbound N6 traffic from the internet, passing through the UPF, become N3 traffic and flow through the virtual firewall functions in the third virtual machine 212 as depicted in FIG. 2C.

FIG. 2D illustrates an example, non-limiting embodiment of service-chaining of the network functions to the virtual firewall functions in accordance with various aspects described herein. In various embodiments, the static routes are introduced in the first, the second and the third virtual machines 214, 216 and 212 to service-chain the virtual firewall functions to the network functions. The service-chaining may enable relevant traffic, such as N2, N3 and N4 traffics, to pass through the virtual firewall functions of the third virtual machine 212.

In one or more embodiments, for the N2 traffic, static routes 1 and 4 (flows 232, 238) are implemented such that the base station 215 forwards the N2 traffic to the AMF via the virtual firewall functions in the third virtual machine 212 and the private mobile core 210 forwards the N2 traffic to the base station 215 via the virtual firewall functions in the third virtual machine 212, as depicted in FIGS. 2C and 2D. For the N3 traffic, static routes 2 and 6 (flows 234, 242) are implemented such that the base station 215 forwards the N3 traffic to the UPF via the virtual firewall functions in the third virtual machine 212 and the private mobile core 210 forwards the N3 traffic from the UPF to the base station 215 via the virtual firewall functions in the third virtual machine 212. For the N4 traffic, static routes 3 and 5 are implemented such that the private mobile core 210 forwards the N4 traffic from the SMF to the UPF via the virtual firewall functions in the third virtual machine 212 and from the UPF to the SMF via the virtual firewall functions (flows 236, 240). Service chaining as depicted in FIG. 2D enables all of the target traffic (N2, N3, the N4 traffic) to pass through the virtual firewall functions in the third virtual machine 212.

In the 5G cellular network, static routes may be established as follows. Static routes may be established and directed such that an gNB forwards the N2 traffic to the AMF through the virtual firewall functions, the gNB forwards the N3 traffic to the UPF through the virtual firewall functions, a 5G mobile core such as the private mobile core 210 forwards the N4 traffic from the SMF to the UPF through the virtual firewall functions, the 5G mobile core forwards the N2 traffic from the AMF to the gNB through the virtual firewall functions, the UPF forwards the N4 traffic from the UPF to the SMF through the virtual firewall functions, and the UPF forwards the N3 traffic from the UPF to the gNB through the virtual firewall functions. Static routes depicted in FIGS. 2C and 2D are by way of example only and various different static routes can be implemented based on network demands and configurations.

In one or more embodiments, the virtual firewall functions implemented in the third virtual machine 212 may be placed in-line with the virtualized network functions in the first virtual machine 214 and the second virtual machine 216 such that various network traffics such as the N2 traffic, the N3 traffic and the N4 traffic pass through the virtual firewall functions prior to reaching the internet, the RAN, base stations, user devices, etc.

In various embodiments, the third virtual machine 212 implementing the virtual firewall functions may be loaded with a policy and a set of rules dictating network traffic flows and relevant security level(s). The policy and the set of rules may be updated or changed based on changes in the virtualized network functions, software updates, system architecture changes, or various other parameters.

Figure 2E:
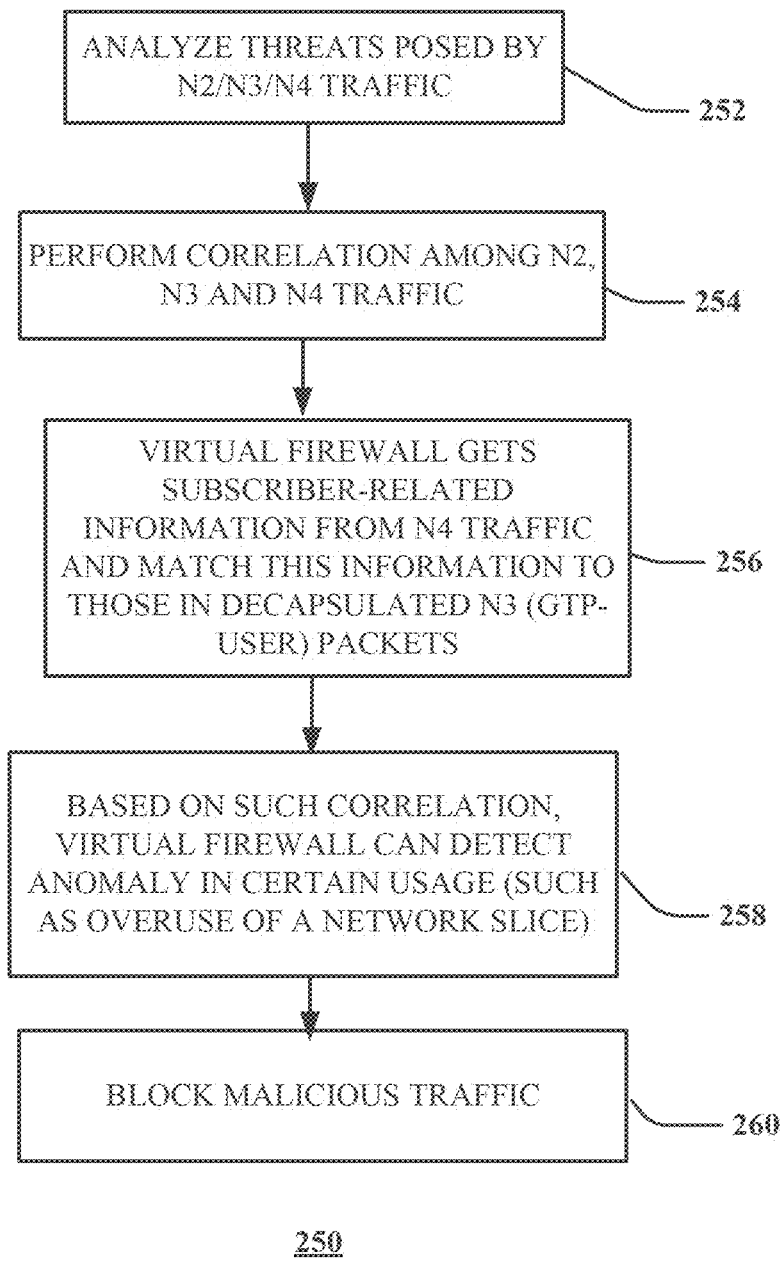
FIG. 2E depicts an illustrative embodiment of a method in accordance with various aspects described herein.

FIG. 2E depicts an illustrative embodiment of a method 250 in accordance with various aspects described herein. In various embodiments, the third virtual machine 212 implementing the virtual firewall functions may perform threat analysis of the N2 traffic, the N3 traffic, and the N4 traffic from the wireless communication network (e.g., the 5G cellular network) to an application layer at Step 252. By way of example, the third virtual machine 212 may correlate various traffic such as the N2 traffic, the N3 traffic, and the N4 traffic at Step 254. For instance, the third virtual machine 212 obtains subscriber-related information, such as IMSI (International Mobile Subscriber Identity), IMEI (International Mobile Equipment Identity), network slices, etc. from the N4 traffic and match this information to information in decapsulated N3 packets (General Packet Radio System (GPRS) Tunnelling Protocol User Plane: GTP-U) at Step 256. Based on such correlation, the third virtual machine 212 can detect one or more anomalies in certain usages, such as overuse of a network slice at Step 258. The third virtual machine 212 can take actions such as generating a notification, blocking malicious traffic, etc. at Step 260.

In various embodiments, machine learning techniques such as deep learning algorithm can be used to perform the threat analysis of the network traffic from the wireless communication network. Malwares may be hidden in encrypted traffic which is encrypted with an encryption protocol such as TLS 1.3. For instance, TLS 1.3 is one of available protocols that encrypts data to provide a secure communication channel between two endpoints. The encrypted traffic can be detected by analyzing the traffic using artificial intelligence (AI). Machine learning is one of subsets of AI which use statistical methods to improve machines with training. Deep learning is a subset of machine learning which includes an artificial neural network having multiple layers of algorithms where an input should pass therethrough, culminating in a final prediction. In some embodiments, a machine learning model may be generated and trained using supervised or unsupervised machine learning techniques.

Various machine learning algorithms and deep learning algorithms are available for performing the network traffic analysis. For instance, random forest algorithm, gradient boosting algorithm, Adaboosting algorithm, linear regression, logistic regression, multilayer perceptrons, Naïve Bayers algorithm, etc. can be used for detecting the encrypted malicious traffic. Random forest algorithm, gradient boosting algorithm, and Adaboosting algorithm represent higher accuracy in detecting the encrypted malicious traffic relative to algorithms such as linear regression, logistic regression, Naïve Bayer algorithm, etc. Commercially available algorithms such as Rohde & Schwarz algorithm can be used with traditional network architecture or for cloud native and heavy computation cases.

In various embodiments, network traffic include different features including time series features, a header, payload data, and statistical features. The time series features include a packet length, inter-arrival time, and a direction of consecutive packets. The header includes all useful fields in a packet, typically layer 3 and layer 4 information, when unencrypted. In pre-deep learning era, fields including port number, protocol, and packet length, were carefully selected by domain experts as representative features. In some recent deep learning-based approaches, entire packets are taken as an input. Even for encrypted traffic, the payload data may be present such as information about layer 4 header and can be exploited for classification. There are numerous statistical features that can be obtained from the entire flow, such as an average packet length and minimum inter-arrival time, which demonstrate high accuracy. However, in order to obtain the statistical features, a classifier may be used to observe the entire or a large portion of the data flow and may be limited to offline classification. Moreover, in some cases like application classifications, the statistical features can be affected by user specific behaviors, OS-specific patterns, or network-specific conditions.

As described in the above described embodiments, a single virtual machine implementing the virtual firewall functions, via the service-chaining, may simultaneously inspect various interfaces (such as the N2 Interface, the N3 Interface and the N4 Interface) of the compact 5G core installed in a single host. With the service-chaining, the virtual firewall functions implemented in the virtual machine may protect multiple network interfaces exposed to external attacks. The virtual machine implementing the virtual firewall functions may perform threat analytics by examining the network and application-level vulnerabilities. The virtual machine implementing the virtual firewall functions may further facilitate rapid detection of threats and prompt response to the threats. Customers who desire to establish a private mobile core may take advantage of the improved security with the virtual firewall functions without requiring additional resources and/or additional hardware equipment. Cellular service providers and cloud service providers may provide private 5G solutions with the integrated and improved security.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, the virtualized communication network 300 can facilitate in whole or in part the private mobile core deployed in the public cloud.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers-cach of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
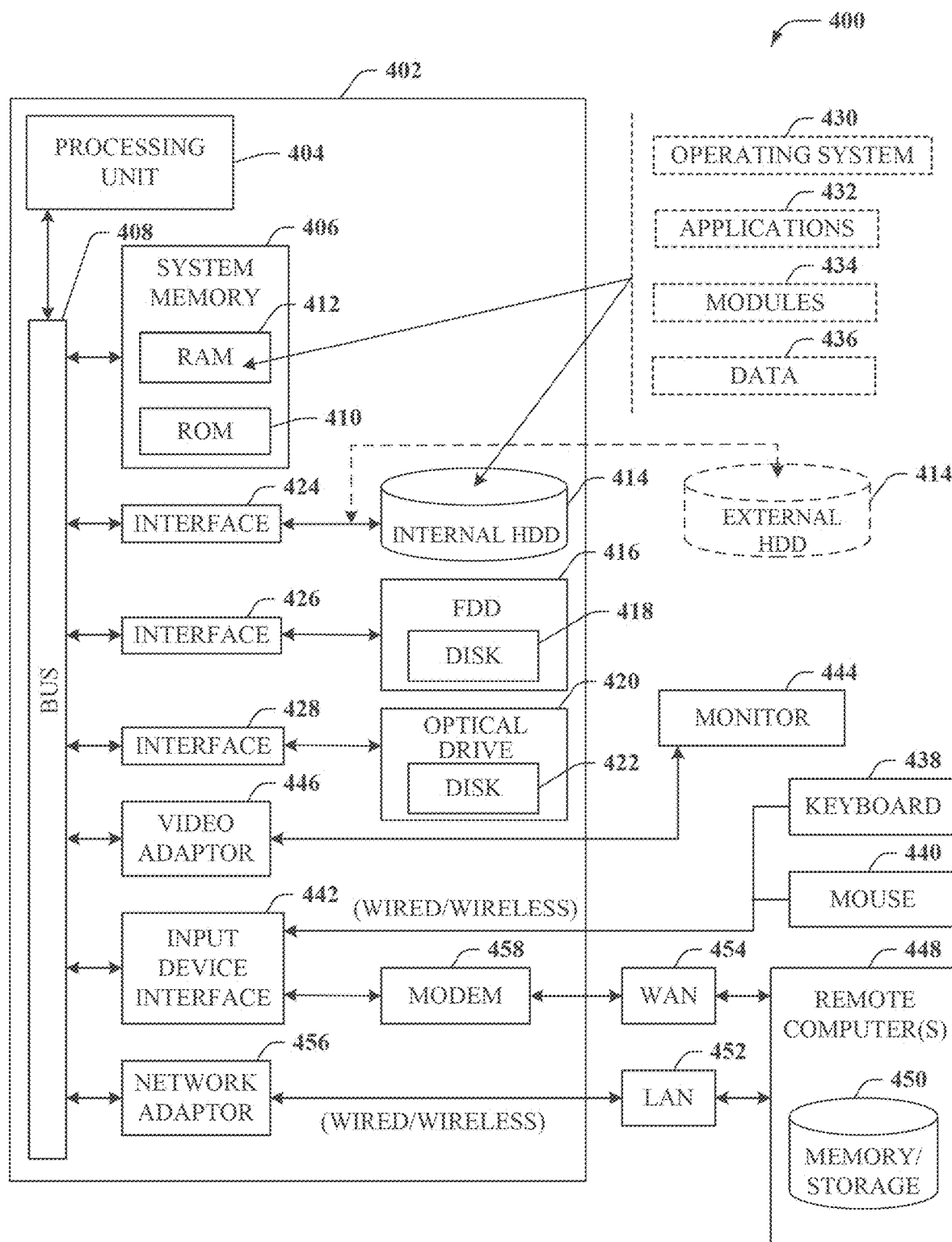
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, the computing environment 400 can facilitate in whole or in part a host server where virtual machines implementing the private mobile core and the virtual firewall functions operate.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
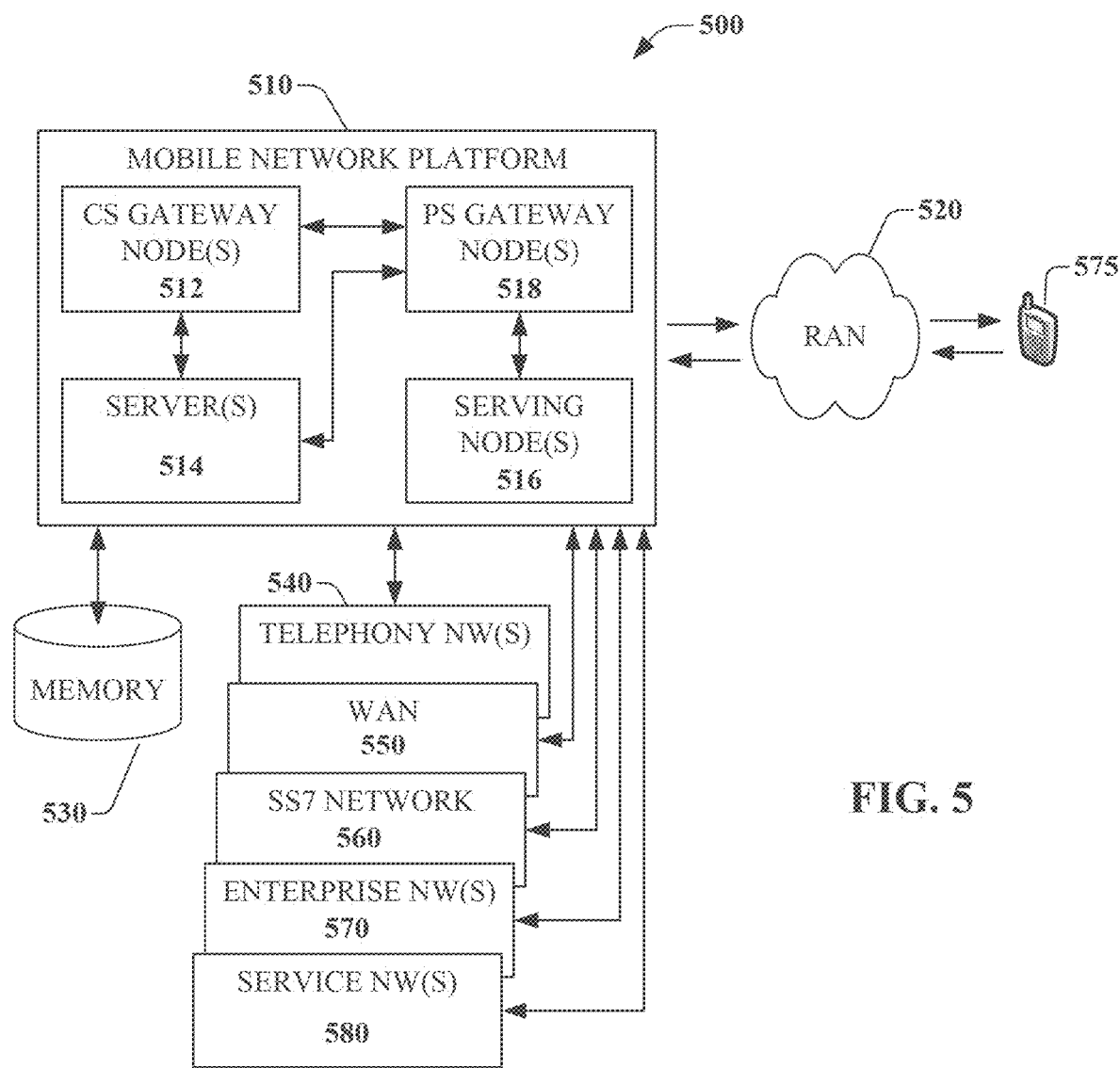
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, the mobile network platform 510 can facilitate in whole or in part the virtualized private mobile core operating on the mobile network platform 510. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ics) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
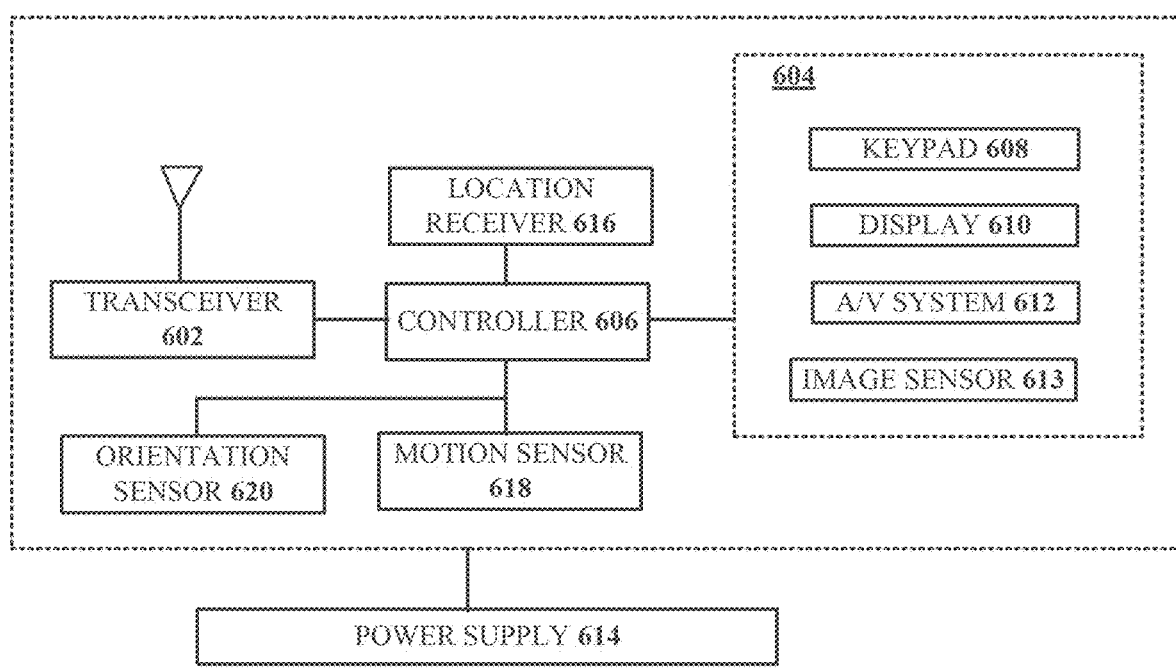
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, the communication device 600 can facilitate in whole or in part user equipment, IoT devices, etc. that transmit data traffic to the private mobile core via the virtual firewall functions.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
  a processing system including a processor; and
  a memory that stores executable instructions that, when executed by the processing system, facilitate performance of operations, the operations comprising:
    deploying a first virtual machine configured to implement a plurality of control plane network functions in a wireless network;
    deploying a second virtual machine configured to implement a user plane function in the wireless network;
    deploying a third virtual machine configured to implement firewall functions, wherein the deploying the third virtual machine comprises deploying the third virtual machine to be in-line with the first virtual machine and the second virtual machine such that a first network traffic flows between a base station and the first virtual machine through the third virtual machine, a second network traffic flows between the base station and the second virtual machine through the third virtual machine, a third network traffic flows between the first virtual machine and the second virtual machine, or a combination thereof; and
    deploying the first virtual machine, the second virtual machine and the third virtual machine on a host server arranged at a user premises.

2. The device of claim 1, wherein the operations further comprise:
  service-chaining the plurality of control plane network functions and the user plane function via the third virtual machine.

3. The device of claim 2, wherein the service-chaining further comprises:
  setting a first static route in the first virtual machine to pass through the third virtual machine; and
  setting a second static route in the second virtual machine to pass through the third virtual machine.

4. The device of claim 1, wherein:
  the deploying the first virtual machine further comprises implementing access and mobility function (AMF) in the first virtual machine; and
  the operations further comprise directing N2 traffic between the base station and the AMF to pass through the third virtual machine.

5. The device of claim 4, wherein the operations further comprise directing N3 traffic between the base station and the user plane function to pass through the third virtual machine.

6. The device of claim 5, wherein:
  the deploying the first virtual machine further comprises implementing session management function (SMF) in the first virtual machine; and
  the operations further comprise directing N4 traffic between the SMF and the user plane function to pass through the third virtual machine.

7. The device of claim 6, wherein the operations further comprise:
  analyzing the N2 traffic, the N3 traffic and the N4 traffic at the third virtual machine;
  determining a presence of an anomaly by correlating the N2 traffic, the N3 traffic, the N4 traffic, or a combination thereof; and
  upon determination that the anomaly is present, generating an action.

8. The device of claim 1, wherein the operations further comprise deploying the third virtual machine at a first interface between one or more of the control plane network functions and the base station and at a second interface between the user plane function and the base station.

9. The device of claim 1, wherein the deploying the third virtual machine further comprises loading a policy and a set of rules dictating network traffic flow and a security level in the third virtual machine.

10. The device of claim 1, wherein the operations further comprise:
  analyzing threats posed by the first network traffic, the second network traffic, the third network traffic, or a combination thereof, by performing a correlation among the first network traffic, the second network traffic and the third network traffic; and matching information from the second network traffic against information from the third network traffic.

11. The device of claim 10, wherein the operations further comprise:

based on the correlation, determining an anomaly in usage of network resources; and blocking a network traffic determined to be relevant to the anomaly among the first network traffic, the second network traffic, the third network traffic, or a combination thereof.

12. A non-transitory machine-readable medium, comprising executable instructions that, when executed by a processing system including a processor, facilitate performance of operations, the operations comprising:

deploying a first virtual machine configured to contain a plurality of control plane network functions in a wireless network;

deploying a second virtual machine configured to contain a user plane function in the wireless network;

deploying a third virtual machine configured to contain firewall functions, wherein the deploying the third virtual machine comprises deploying the third virtual machine to be in-line such that first network traffic flow between a base station and the first virtual machine through the third virtual machine, second network traffic flow between the base station and the second virtual machine through the third virtual machine, third network traffic flow between the first virtual machine and the second virtual machine, or a combination thereof; and deploying the first virtual machine, the second virtual machine and the third virtual machine on a host server arranged at a user premises.

13. The non-transitory machine-readable medium of claim 12, wherein the operations further comprise deploying the third virtual machine simultaneously at a first interface between one or more of the control plane network functions and the base station and at a second interface between the user plane function and the base station.

14. The non-transitory machine-readable medium of claim 12, wherein the operations further comprise:

service-chaining the plurality of control plane network functions and the user plane function via the third virtual machine; and setting a plurality of static routes in the first virtual machine and in the second virtual machine to pass through the third virtual machine.

15. A method, comprising:

deploying, by a processing system including a processor, a private mobile core on a host server located at a user premises, the deploying comprising:

deploying a first virtual machine configured to implement a plurality of control plane network functions in a wireless communication network; and deploying a second virtual machine configured to implement a user plane function in the wireless communication network;

deploying, by the processing system, a third virtual machine configured to implement firewall functions on the host server, wherein the deploying the third virtual machine comprises deploying the third virtual machine to be in-line such that first network traffic flow between a base station and the first virtual machine through the third virtual machine, second network traffic flow between the base station and the second virtual machine through the third virtual machine, third network traffic flow between the first virtual machine and the second virtual machine, or a combination thereof; and setting, by the processing system, one or more static routes of network traffic to pass through the third virtual machine while flowing between the base station and the private mobile core.

16. The method of claim 15, wherein the setting the one or more static routes further comprises:

directing, by the processing system, a first network traffic between the base station and the first virtual machine, a second network traffic between the first virtual machine and the second virtual machine, a third network traffic between the base station and the second virtual machine, or a combination thereof, to pass through the third virtual machine.

17. The method of claim 16, further comprising:

analyzing, by the processing system, threats posed by the first network traffic, the second network traffic, the third network traffic, or a combination thereof, by performing a correlation among the first network traffic, the second network traffic and the third network traffic.

18. The method of claim 17, wherein the performing the correlation further comprises matching, by the processing system, information from the second network traffic against information from the third network traffic.

19. The method of claim 17, further comprising:

based on the correlation, determining, by the processing system, an anomaly in usage of network resources; and blocking, by the processing system, a network traffic determined to be relevant to the anomaly among the first network traffic, the second network traffic, the third network traffic, or a combination thereof.

20. The method of claim 17, further comprising:

based on the correlation, determining, by the processing system, a malicious traffic; and blocking, by the processing system, a network traffic determined to be relevant to the malicious traffic among the first network traffic, the second network traffic, the third network traffic, or a combination thereof.

* * * * *

UNITED STATES PATENT AND TRADEMARK OFFICE
CERTIFICATE OF CORRECTION

PATENT NO. : 12,487,847 B2
APPLICATION NO. : 18/300641
DATED : December 2, 2025
INVENTOR(S) : Tarun Chaki Page 1 of 1

It is certified that error appears in the above-identified patent and that said Letters Patent is hereby corrected as shown below:

In the Specification

In Column 13, Line 30 "crasable" should read "erasable"
In Column 16, Line 43 "queuc" should read "queue"
In Column 18, Line 39 "car" should read "ear"

Signed and Sealed this
Thirteenth Day of January, 2026

John A. Squires
*Director of the United States Patent and Trademark Office*